3,118,909
PURIFICATION OF GIBBERELLINS
Louis Roux, Le Mesnil-Saint-Denis, Seine-et-Oise, France, assignor to Societe d'Etudes et d'Applications Biochimique, Jouy-en-Josas, France, a French company
No Drawing. Filed Nov. 14, 1961, Ser. No. 152,166
Claims priority, application France Nov. 17, 1960
8 Claims. (Cl. 260—343.3)

The present invention relates to the purification of gibberellins, and provides a process which produces crystallized gibberellins of a purity of the order of 95%. The word "purity" is here used to mean not that the product is necessarily composed of a single chemical species, but rather that is contains by weight in the stated percentage substances belonging to the class of gibberellins, and of which the quantities present can be determined by chemical methods and also by the measure of their biological activity. Percentage figures on gibberellin content or purity hereinafter given are to be understood in this sense.

The process of the invention comprises two stages. The first produces raw crystals which may contain from 70% to 85% of gibberellins, and the second comprises the purification of these raw crystals to a purity of the order of 95%.

*First stage.*—The first stage comprises, broadly speaking, two methods for the production of the raw crystals. The first of these is based on the fact that upon percolation of ammonia liquor through a column of weak anion exchange resin charged with gibberellins from a culture broth, the first fractions of the ammoniacal eluate obtained are sufficiently pure to make possible the direct production of raw crystals by mere extraction of the gibberellins from those fractions of the eluate with ethyl acetate and concentration of the extract, without recourse to other purifying steps.

These first fractions, eluted from a column of resin onto which the gibberellins have been adsorbed from a culture broth, are thus useable for the production of the raw crystals of statge one of the invention. These fractions, having a pH between 5 and 8, comprise about one-half of the total gibberellins in the column.

The novelty of the process does not reside in the use of ethyl acetate, or of any other solvent immiscible in water, for the use of such solvents has been known since the first work on gibberellins. Rather it resides in the simplification resulting from operation on relatively pure fractions.

The obtaining of such fractions represents a characteristic feature and an important advantage of the extraction of gibberellins from a culture broth by means of weak anion exchange resin.

In industrial operations employing this method of extracting gibberellins from the culture broth it therefore suffices to segregate these fractions to produce crystallized gibberellins.

The second method for deriving the raw crystals of the first stage of the invention starts with the later, impure fractions of the ammoniacal eluate above referred to, or with the product residues of other processes for gibberellin manufacture, or with the mother liquors of gibberellin crystallization, or with solvents which have been used in washing gibberellin crystals, or with impure gibberellins containing extracts obtained by other methods of gibberellin production, such as for example concentrates in acetone of gibberellins derived from adsorption onto activated carbon. The second method for deriving the raw crystals of the first stage of the invention requires however that these fractions be subjected to a preliminary purification. This preliminary purification comprises a chromatographic purification on a weak anion exchange resin, for example of the type IR-4B. This pre-purification process may include the following steps:

(1) Dilution of the solution of impure fractions in about ten times its own volume of ordinary water.

(2) Acidification of the diluted solution by removal of cations upon passage through a column of weak cation exchange resin, for example of the type IRC50, form H, if the starting material for the pre-purification process comprises an eluate rich in cations such as the impure fractions of the ammoniacal eluate above mentioned. If instead the solution contains few cations, in the case for example of starting materials such as acetonic eluates or product residues of gibberellin manufacture, the acidification may be effected simply by addition of a little hydrochloric acid to bring the pH down to 4.5.

(3) Fixing the gibberellins onto a column of weak anion exchange resin, for example of type IR-4B employed as its formate, by percolation of the diluted solution therethrough at the rate of one milliliter of resin for about 80 milligrams of gibberellins.

(4) Elution of the gibberellins from the resin by percolation of ammonia therethrough, the percolation being carried out very slowly at a rate of about 0.1 milliliter per square centimeter per minute.

Experience has shown that by using the resin as its formate and by carrying out the elution slowly enough, about 80% of the gibberellins are obtained in the form of relatively pure fractions from which raw crystals can be obtained by application of the same process as that used in the first method for carrying out the first stage of the invention.

*Second stage.*—The method of the second stage of the invention comprises essentially purification of the products obtained in the first stage by adsorption onto activated carbon of the impurities which those products contain (the operation being carried out by means of an aqueous medium under such conditions that the quantity of gibberellins fixed on the carbon is negligible), extraction of the purified gibberellins by means of a solvent such as ethyl acetate which is subsequently evaporated off, crystallization of the gibberellins in pure ethyl acetate, and subsequent washing and drying of the crystals. More specifically, the process of the second stage of the invention comprises the following steps:

(1) Dissolving in water to a concentration of from 15 to 20 grams per liter the raw crystals obtained in the first stage of the invention. For this purpose it is sufficient to place the crystals in suspension in the corresponding volume of water and to pour in slowly, with stirring, an alkaline solution of known composition such as NaOH, the alkali being added in an amount slightly less than that which would be necessary to completely neutralize the gibberellins, so that the final pH is in the vicinity of 5.

(2) Adding to the solution a small quantity of activated carbon, for example, that known as "Norit" in an amount of approximately of from 5% to 10% by weight of the gibberellins to be purified. This is followed by careful filtering after about a half-hour of contact with the activated carbon, so as to obtain a perfectly clear and practically colorless solution.

(3) Extraction of the gibberellins from this purified solution to obtain them in crystalline form, according to a known process which comprises acidifying the solution to a pH of 3, extracting the gibberellins therefrom with ethyl acetate and evaporating the solvent as a result of which crystallization occurs.

(4) Washing of the crystals several times, the crystals being placed in suspension in a little ethyl acetate which is preferably saturated with gibberellins. Each washing is followed by a draining after which the crystals are finally dried preferably in vacuum and in the presence of phosphoric anhydride.

The following examples are illustrative of the case with which purified, crystalline gibberellins may be recovered in accordance with the invention.

*Example I*

Raw crystals of gibberellins were obtained from comparatively pure elution fractions isolated from fermentation liquors containing these metabolites using the following reaction sequence:

(1) *Selection of comparatively pure fractions.*—The gibberellins contained in 100 liters of a fermentation liquid were adsorbed onto a column packed with a weak anion exchange resin (type IR–4B in acetate form) according to the method described in my co-pending United States patent application Serial No. 148,691, filed on October 30, 1961.

The elution of gibberellins was carried out by percolating 1-N ammonia through the column containing the adsorbed gibberellins and the elution fractions collected, yielding successive eluates having an increasing pH in the range from 5 to 9.5.

According to the method of the invention, the fractions which were obtained in the pH range from 5 to 8, which fractions are purer in gibberellins than all other fractions, yield crude crystalline gibberellins by extraction with ethyl acetate and subsequent evaporation of the solvent.

Altogether, the hundred liters of culture medium contained 42 grams of gibberellins (calculated for a pure chemical). Analysis showed that the selected fractions contained 19.6 grams of pure gibberellins, representing slightly less than half the theoretical recovery. Their volume was 1.9 liters in all. The remaining fractions, which were at a pH in excess of 8, constituted the impure fractions which can be utilized according to the second method described above for carrying out the first stage of the invention.

(2) *Acidification and extraction.*—Hydrochloric acid (6-N) was poured slowly, with stirring, into the selected fractions to acidify them until the pH had been adjusted to 3. The final volume was now approximately 2 liters. The gibberellins were extracted twice from solution, using 2 liters of ethyl acetate for each extraction.

(3) *Evaporation and crystallization.*—The solvent was evaporated at a reduced pressure, the water-bath being at a temperature of 60° C. Towards the end of the operation, crystals gathered on the surfaces of the distillation flask. The distillation was continued until the volume of crystals was about 30 milliliters, after which the flask was kept for a few hours at a temperature of 5° C. After cooling, the residue formed a doughy mass which was slurried with about 10 milliliters of ethyl acetate and then poured onto a sintered glass filter, using a spatula. The crystals were drained, rinsed twice with two 10 milliliter portions of ethyl acetate (which was first used for rinsing the flask), again drained, and dried. The dry product thus obtained weighed a little more than 21 grams and contained 80% by weight (i.e., a little less than 17 grams) of pure gibberellins.

*Example II*

Raw crystals of gibberellins were obtained from impure fractions according to the second method described above, using the following reaction sequence:

(1) *Dilution.*—The impure fractions mentioned in Example I, which were collected from the resin column after the pH of the eluate had reached 8, contained 19.2 grams of gibberellins, calculated as the pure chemical. To these fractions were added the wash and crystallization residues resulting from the operation described in the Example I.

The combined fractions contained 20.7 grams of pure gibberellins mixed with impurities, had the pH of about 9.5, and a light brown color. The fractions were then diluted with water to a volume of 12 liters.

(2) *Acidification.*—The diluted fraction was rapidly percolated through a weak cation exchange resin column (type IRC50, in its acid form), using a resin volume of about 1 liter. After percolating, the resin was washed with 1 liter of water, which was added to the effluent. The combined eluate and wash waters had a pH of 4.5.

(3) *Adsorption of the gibberellins onto a weak anion exchange resin.*—The liquid was then passed through a small column packed with a weak anion exchange resin, type IR–4B as its formate, the column dimensions being as follows: diameter 4 cm. (i.e., a section of about 12.5 cm.$^2$), resin height 20 cm. and volume 250 milliliters, making 1 milliliter of resin for about 90 milligrams of gibberellins.

The rate of percolation was 3 ml./cm.$^2$/minute, the time of the operation being about 6 hours.

(4) *Elution of gibberellins and selection of comparatively pure fractions.*—The adsorbed gibberellins were slowly eluted from the column over a 9-hour period using 1-N ammonia (0.1 ml./cm.$^2$/minute). The gibberellins began to come out after the passage of 160 milliliters of eluate. In all, 450 milliliters of eluate coming out with a pH lower than 8, and 100 milliliters with a pH higher than 8, were collected for further work-up.

This 450 milliliter fraction contained 16 grams of gibberellins, calculated as the pure chemical, and was relatively free from impurities.

These comparatively pure fractions were treated in exactly the same way as the fractions of Example I, namely by acidification with HCl, extraction with ethyl acetate, evaporation of the solvent, rinsing, draining and drying of the crystals, yielding 17.8 grams of crystalline gibberellins having a purity of about 78%, corresponding to 13.8 grams of the pure product.

*Example III*

To obtain purified, crystalline gibberellins having a chemical purity of about 94% by weight, the following sequence of steps was carried out:

(1) *Dissolution.*—15 grams of raw crystals containing 80% by weight of gibberellins obtained by the method set forth in Example I were suspended in 950 milliliters of water, to which was slowly added, with stirring, 1-N sodium hydroxide until the crystals had completely dissolved, the pH of the solution being approximately 5. To obtain this pH less than 35 milliliters of NaOH were required. The solution was a little turbid and yellow colored.

(2) *Treatment with activated charcoal.*—Approximately 1 gram of activated charcoal (e.g. "Norit") was added to the solution, and stirred for about ¼ hour, after which the solution was filtered until the liquid was quite clear and colorless.

(3) *Extraction with ethyl acetate.*—The solution was acidified to a pH of approximately 3, by adding 8 milliliters of 5-N hydrochloric acid dropwise and stirring the resultant soltuion. Two extractions of the solution with ethyl acetate, using equal volumes of solvent and solution for each extraction, completely removed the gibberellins from the aqueous phase, which was decanted from the solvent extracts.

(4) *Solvent evaporation.*—The ethyl acetate extract was evaporated at reduced pressure, using a water-bath temperature of 60° C. Towards the end of the operation, there remained no more than about 10 milliliters of the extract, to which was added 10 milliliters of alcohol, and the mixed extract was evaporated to dryness. The residue had the appearance of a transparent, tough, light yellow-colored gum.

(5) *Crystallization.*—The residue was kneaded with a glass-rod in the presence of 25 milliliters of ethyl acetate, and heated on a water-bath for a short time to redissolve it. The solution, which was clear at first, became turbid and then turned milky, later clarifying gradually when the gibberellin crystals had grown large enough to settle at the bottom of the container. The formation of rather big crystals was promoted by stirring the liquid almost continually and subjecting it alternatively to reheatings and coolings over a narrow temperature range. After about one hour, the container was cooled and allowed to stand for half a day.

(6) *Washing, draining and drying of the crystals.*—The crystalline gibberellins were then placed onto a sintered glass filter of small diameter (4 cm.) so that the layer of crystals was about 3 cm. in thickness in presence of the liquid.

Crystals were dried with the help of a moderate vacuum. Then, with the vacuum removed, about 15 milliliters of ethyl acetate nearly saturated with gibberellins were poured onto the filter. Next, the crystals were suspended in the ethyl acetate solvent by stirring with a spatula, and finally dried. There were carried out three such washings followed by drying.

The solvent employed for these washings had been saturated with gibberellins by using the crystals clinging to the surfaces of the crystallization container, which could not readily be recovering on the filter. The mass of the crystals washed and drained on the filter, but still slightly wet, was then placed in an Erlenmeyer flask, in which the crystals were coarsely desiccated by the application of a vacuum, after which they were placed in a desiccator and dried over phosphoric anhydride and pellet-potash, yielding 12 grams of dry, white crystals, containing 94% by weight of pure gibberellins.

I claim:

1. A process for recovering crystalline gibberellins having a chemical purity of the order of 90 to 95 percent by weight from an aqueous, acidic solution of gibberellins in which there remain impurities which comprises (a) contacting the aqueous, acidic solution of gibberellins with a weakly basic anion exchange polyamine resin to selectively adsorb the gibberellins onto the anion exchange resin and extract them from the solution, (b) treating the anion exchange resin containing the adsorbed gibberellins with an aqueous ammoniacal eluate to eluate the adsorbed gibberellins from the anion exchange resin and thereby dissolve them in the eluate, (c) selecting the first fractions of the gibberellin-containing ammoniacal eluate produced by step (b) having a pH between about 5 and 8, (d) acidifying the said selected fractions to a pH of not more than about 3, (e) extracting the gibberellins from the acidified selected fractions with a water-immiscible solvent in which gibberellins are soluble and thereafter evaporating the solvent extract to produce crude, crystalline gibberellins, (f) redissolving the crude, crystalline gibberellins in an aqueous solution adjusted to a pH of about 5, (g) treating the acidic solution of redissolved gibberellins with activated carbon in an amount sufficient to adsorb the impurities from the solution while leaving the major part of the gibberellins in solution, (h) filtering said last-named solution, acidifying it to a pH of about 3 and extracting the gibberellins therefrom with a water-immiscible solvent, and (i) crystallizing the said extracted gibberellins by evaporation of the solvent to form crystalline gibberellins having a purity of the order of 90 to 95 percent by weight.

2. A process for recovering crystalline gibberellins having a chemical purity of the order of 90 to 95 percent by weight from an impurity-containing solution of gibberellins which comprises (a) diluting the solution with water to a gibberellin concentration of the same order as that existing in the culture broth in which they are initially formed, (b) acidifying the diluted solution to a pH of about 4.5, (c) contacting the acidified solution of gibberellins with a weakly basic anion exchange polyamine resin to selectively adsorb the gibberellins onto the anion exchange resin and extract them from the solution, (d) treating the anion exchange resin containing the adsorbed gibberellins with an aqueous ammoniacal eluate to elute the absorbed gibberellins from the anion exchange resin and thereby dissolve them in the eluate, (e) selecting the first fractions of the gibberellin-containing ammoniacal eluate produced by step (d) having a pH between about 5 and 8, (f) acidifying the said selected fractions to a pH of not more than about 3, (g) extracting the gibberellins from the acidified selected fractions with a water-immiscible solvent in which gibberellins are soluble and thereafter evaporating the solvent extract to produce crude, crystalline gibberellins, (h) redissolving the crude, crystalline gibberellins in an aqueous solution adjusted to a pH of about 5, (i) treating the acidic solution of redissolved gibberellins with activated carbon in an amount sufficient to adsorb the impurities from the solution while leaving the major part of the gibberellins in solution, (j) filtering said last-named solution, acidifying it to a pH of about 3 and extracting the gibberellins therefrom with a water-immiscible solvent, and (k) crystallizing the said extracted gibberellins by evaporation of the solvent to form crystalline gibberellins having a purity of the order of 90 to 95 percent by weight.

3. A process according to claim 2 in which the first acidification step is effected by contacting the diluted solution with a weakly acidic cation exchange carboxylic resin.

4. The process of claim 2 in which the crude, crystalline gibberellins are redissolved to a concentration of from 15 to 20 grams of crystals per liter of aqueous solution.

5. The process of claim 2 in which the redissolved gibberellins are treated with activated carbon amounting to from 5 to 10 percent by weight of the weight of redissolved gibberellins.

6. The process of claim 2 in which the water-immiscible solvent is ethyl acetate.

7. A process according to claim 2 in which the impurity-containing solution of gibberellins comprises the late fractions of pH above about 8 of the ammoniacal eluate obtained upon elution of gibberellins from the weakly basic anionic exchange polyamine resin onto which they have been adsorbed from the gibberellin-bearing solution.

8. The process for raising the chemical purity of crystalline gibberellins from a purity between about 70 and 85 percent by weight to purity of the order of 90 to 95 percent by weight which comprises (a) redissolving the crystals in an aqueous solution adjusted to a pH of about 5, (b) treating the acidic solution of redissolved gibberellins with activated carbon in an amount sufficient to adsorb the impurities from the solution while leaving the major part of the gibberellins in solution, (c) filtering said last-named solution, acidifying it to a pH of about 3 and extracting the gibberellins therefrom with a water-immiscible solvent, and (d) crystallizing the said extracted gibberellins by evaporation of the solvent to form crystalline gibberellins having a purity of the order of 90 to 95 percent by weight.

References Cited in the file of this patent

FOREIGN PATENTS 233,398    Australia _____ Mar. 27, 1958

OTHER REFERENCES

Borrow et al.: J. Sci. Food Agric., vol. 6 (1955), page 343.

Berggren et al.: Acta Chemica Scand., vol. 12 (1958), pages 1521–1527.